(12) United States Patent
Sekiya et al.

(10) Patent No.: US 11,312,410 B2
(45) Date of Patent: Apr. 26, 2022

(54) ELECTRIC POWER STEERING APPARATUS

(71) Applicant: TOYOTA JIDOSHA KABUSHIKI KAISHA, Toyota (JP)

(72) Inventors: Yoshihide Sekiya, Chiryu (JP); Shunsuke Yoshida, Nisshin (JP); Tomoyuki Iida, Nisshin (JP); Takashi Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/796,407

(22) Filed: Feb. 20, 2020

(65) Prior Publication Data

US 2020/0269908 A1 Aug. 27, 2020

(30) Foreign Application Priority Data

Feb. 21, 2019 (JP) .............................. JP2019-029793

(51) Int. Cl.
  *B62D 5/04* (2006.01)
  *B62D 15/02* (2006.01)
  *B62D 5/00* (2006.01)
  *B62D 6/00* (2006.01)

(52) U.S. Cl.
  CPC ............ *B62D 5/0463* (2013.01); *B62D 5/005* (2013.01); *B62D 15/021* (2013.01)

(58) Field of Classification Search
  CPC ........ B62D 5/04; B62D 5/0463; B62D 5/046; B62D 6/00; B62D 6/10
  See application file for complete search history.

(56) References Cited

U.S. PATENT DOCUMENTS

| | | | | |
|---|---|---|---|---|
| 7,242,161 B2* | 7/2007 | Okamoto | ............. | B62D 5/0448 180/446 |
| 7,546,896 B2* | 6/2009 | Furusho | ............... | B62D 5/0463 180/446 |
| 2010/0017064 A1* | 1/2010 | Kojima | ................ | B62D 5/0457 701/42 |
| 2010/0204889 A1* | 8/2010 | Watanabe | ............ | B62D 5/0466 701/42 |
| 2012/0296525 A1* | 11/2012 | Endo | ..................... | B62D 6/008 701/42 |
| 2013/0060427 A1* | 3/2013 | Kataoka | ............... | B62D 5/0466 701/42 |

(Continued)

FOREIGN PATENT DOCUMENTS

| | | |
|---|---|---|
| CN | 104163198 A | 11/2014 |
| JP | 2003-26022 A | 1/2003 |
| JP | 2004-90782 A | 3/2004 |

*Primary Examiner* — Tan Q Nguyen
(74) *Attorney, Agent, or Firm* — Sughrue Mion, PLLC

(57) ABSTRACT

The electric power steering apparatus according to the present disclosure includes a steering assist mechanism and a controller. The steering assist mechanism is driven by a motor and assists operation of a steering wheel by a driver. The controller acquires the position of the steering wheel and sets a target value of a steering reaction torque acting on the steering wheel. Then, the controller calculates a position target of the steering assist mechanism based on the position of the steering wheel and the target value of the steering reaction torque, and controls the motor of the steering assist mechanism according to the position target of the steering assist mechanism.

4 Claims, 5 Drawing Sheets

(56) References Cited

U.S. PATENT DOCUMENTS

2014/0343794 A1\* 11/2014 Tamaizumi .......... B62D 5/0472
                                                    701/42
2015/0291210 A1\* 10/2015 Kageyama ............... B62D 5/04
                                                    701/41

\* cited by examiner

ELECTRIC POWER STEERING APPARATUS

CROSS-REFERENCE TO RELATED APPLICATION

The present application claims priority under 35 U.S.C. § 119 to Japanese Patent Application No. 2019-029793, filed Feb. 21, 2019. The contents of this application are incorporated herein by reference in their entirety.

BACKGROUND

Field

The present disclosure relates to an electric power steering apparatus having a steering assist mechanism driven by a motor and assisting operation of a steering wheel by a driver by the steering assist mechanism.

Background Art

In a conventional electric power steering apparatus, a value of an assist torque output by a motor of a steering assist mechanism is determined in accordance with magnitude of a steering torque input by a driver to a steering wheel. In other words, in the conventional electric power steering device, torque control is performed in control of the steering assist mechanism.

JP 2003-026022 A discloses an example of such a conventional electric power steering apparatus.

SUMMARY

The steering torque required to steer a vehicle varies depending on vehicle conditions such as loading capacity and tire specifications. In other words, if the vehicle conditions are different, the relationship between steering torque and steering angle will also be different. In the case of a vehicle equipped with an electric power steering system, a driver only bears some of the required steering torque. However, even though the steering torque to be burdened is small, if changes occur in steering torque for each vehicle condition, the driver may not be able to obtain a constant steering feeling and may feel a strange feeling.

The present disclosure has been made in view of the above problems, and an object thereof is to provide an electric power steering apparatus capable of obtaining a constant steering feeling regardless of vehicle conditions.

The electric power steering apparatus according to the present disclosure has a steering assist mechanism driven by a motor, and operation of a steering wheel by a driver is assisted by the steering assist mechanism. The electric power steering apparatus according to the present disclosure includes a controller comprising at least one processor and at least one memory coupled to the at least one processor. The at least one memory includes at least one program that causes the controller to operate as follows.

The controller of the electric power steering apparatus according to the present disclosure acquires the position of the steering wheel, sets a target value of the steering reaction torque acting on the steering wheel, calculates a position target of the steering assist mechanism based on the position of the steering wheel and the target value of the steering reaction torque, and performs feedback control of the motor according to the position target of the steering assist mechanism.

For the acquisition of the position of the steering wheel, for example, the following embodiments can be taken. If the electric power steering apparatus has a steering wheel rotation angle sensor, the position of the steering wheel detected by the steering wheel rotation angle sensor may be acquired. Further, if the electric power steering apparatus has a steering assist mechanism rotation angle sensor for detecting a position of the steering assist mechanism and a steering reaction torque sensor for detecting the steering reaction torque acting on the steering wheel, the position of the steering wheel estimated based on the position of the steering assist mechanism and the steering reaction torque may be acquired. The steering assist mechanism rotation angle sensor may be configured to detect the position of the motor and calculate the position of the steering assist mechanism from the position of the motor and the reduction ratio of the steering assist mechanism.

The target value of the steering reaction torque may be set, for example, based on the position of the steering wheel. Further, in addition to the position of the steering wheel, the target value of the steering reaction torque may be set in consideration of information about the motion state of the vehicle and the running environment.

According to the electric power steering apparatus according to the present disclosure, the position target of the steering assist mechanism is determined so that steering reaction torque according to the target acts on the steering wheel, and the feedback control of the motor is performed so that the position target of the steering assist mechanism is realized. Thus, the steering reaction torque according to the target is applied to the steering wheel regardless of the vehicle conditions, and the driver can obtain a constant steering feeling regardless of the vehicle conditions.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, configurations that are described in the embodiment shown as follows are not always indispensable to the disclosure unless specially explicitly shown otherwise, or unless the disclosure is explicitly specified by the structures or the steps theoretically.

1. First Embodiment

Figure 1:
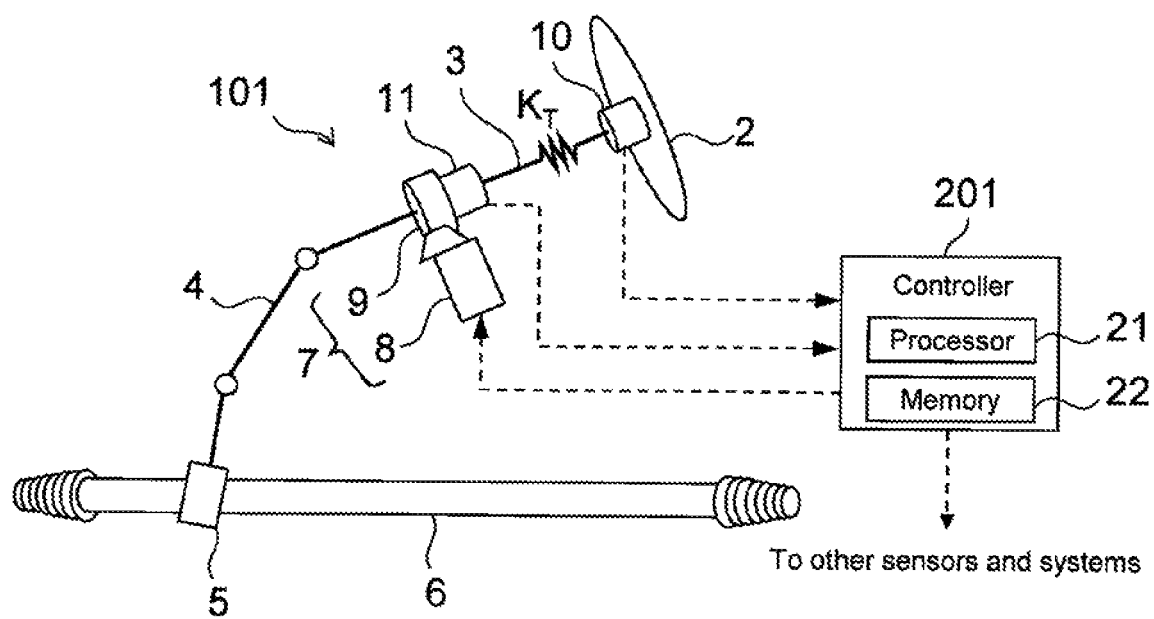
FIG. 1 is a diagram illustrating a configuration of an electric power steering apparatus according to a first embodiment of the present disclosure.

FIG. 1 is a diagram illustrating a configuration of an electric power steering apparatus 101 according to a first embodiment of the present disclosure. The electric power steering apparatus 101 includes a steering wheel 2, a steering shaft 3, a connecting shaft 4, a rack and pinion mechanism 5, and a rack shaft 6. The rotary motion of the steering wheel 2 is input to the steering shaft 3. The rotary motion input to the steering shaft 3 is input to the connecting shaft 4 connected by a universal joint and is input from the connecting shaft 4 to the rack and pinion mechanism 5. The input rotary motion is converted into linear motion while being decelerated by the rack and pinion mechanism 5 and transmitted to the rack shaft 6. The linear motion of the rack shaft 6 in its axial direction changes the turning angle of steering tires (not shown) through a tie rod (not shown).

The electric power steering apparatus 101 includes a steering assist mechanism 7 for assisting the steering operation of the steering wheel 2 by the driver. The steering assist mechanism 7 is composed of a motor 8 and a reduction gear mechanism 9 which transmits rotary motion from the motor 8 to the steering shaft 3. The motor 8 is a servo motor. The torque output by the motor 8 is increased by the reduction gear mechanism 9 and applied to the steering shaft 3.

The electric power steering apparatus 101 includes a steering wheel rotation angle sensor 10. The steering wheel rotation angle sensor 10 is a sensor for detecting the position, that is, the rotation angle, of the steering wheel 2. The steering wheel rotation angle sensor 10 is an absolute angle sensor, and detects the position of the steering wheel 2 as an absolute angle with the neutral position of the steering wheel 2 as an origin. The steering angle, which will be described later, means the position of the steering wheel 2.

The electric power steering apparatus 101 includes a steering assist mechanism rotation angle sensor 11. The steering assist mechanism rotation angle sensor 11 is a sensor that detects the position, that is, the rotation angle, of the steering assist mechanism 7. The position of the steering assist mechanism 7 means the rotation angle of the steering shaft 3 which is rotatably driven by the steering assist mechanism 7. The steering assist mechanism rotation angle sensor 11 is a relative angle sensor, and detects the position of the steering assist mechanism 7 as a relative angle in the range of 360 degrees.

The electric power steering apparatus 101 comprises a controller 201. The controller 201 is an ECU (Electronic Control Unit) having at least one processor 21 and at least one memory 22. In the memory 22, various data and various programs including the map are stored. When the processor 21 reads programs from the memory 22 and executes them, various functions related to steering assist control are realized in the controller 201. Each output of the steering wheel rotation angle sensor 10 and the steering assist mechanism rotation angle sensor 11 is input to the controller 201.

Figure 2:
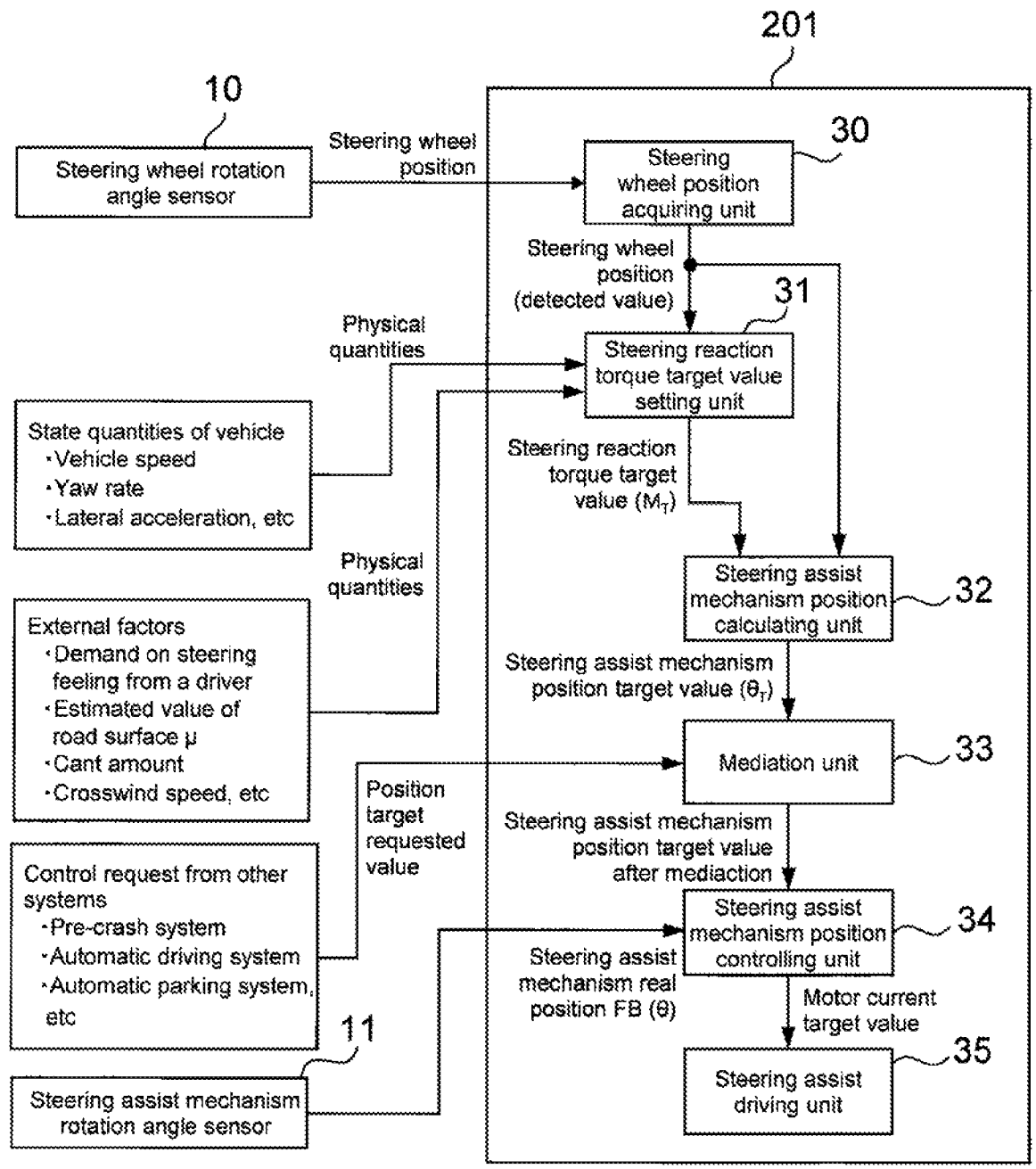
FIG. 2 is a diagram illustrating functions of a controller of the electric power steering apparatus according to the first embodiment of the present disclosure.

FIG. 2 is a diagram illustrating functions of the controller 201 of the present embodiment. In FIG. 2, functions related to steering assist control are represented by blocks. The controller 201 includes a steering wheel position acquiring unit 30, a steering reaction torque target value setting unit 31, a steering assist mechanism position calculating unit 32, a mediation unit 33, a steering assist mechanism position controlling unit 34, and a steering assist driving unit 35 as functions for the steering assist control. However, these units 30-35 provided by the controller 201 do not exist as hardware, but are realized by software when the program stored in the memory 22 is executed by the processor 21. The steering wheel position acquiring unit 30 is realized when acquiring processing is executed by the processor 21, the steering reaction torque target value setting unit 31 is realized when setting processing is executed by the processor 21, the steering assist mechanism position target calculating unit 32 is realized when calculating processing is executed by the processor 21, and the steering assist mechanism position control unit 34 is realized when controlling processing is executed by the processor 21.

The steering wheel position acquiring unit 30 acquires the position of the steering wheel 2 detected by the steering wheel rotation angle sensor 10. The steering wheel position acquiring unit 30 inputs the acquired position of the steering wheel 2 into the steering reaction torque target value setting unit 31 and the steering assist mechanism position target calculating unit 32.

The steering reaction torque target value setting unit 31 sets a target value of the steering reaction torque acting on the steering wheel 2. In setting the target value of the steering reaction torque, the position of the steering wheel 2, that is, the steering angle, and various physical quantities corresponding to the state quantities of the vehicle are referred to. The state quantities of the vehicle to be referred to include, for example, vehicle speed, yaw rate, lateral acceleration, and the like. The vehicle speed is detected by a wheel speed sensor. The yaw rate is detected by the yaw rate sensor. The lateral acceleration is detected by an acceleration sensor or calculated from the yaw rate and vehicle speed.

Figure 3:
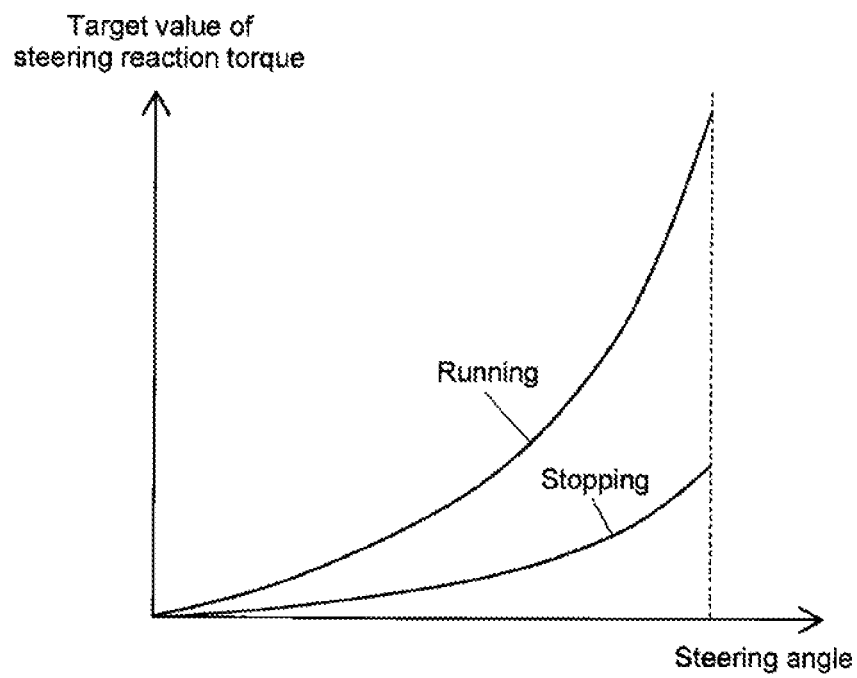
FIG. 3 is a diagram illustrating an example of a setting method of a target value of a steering reaction torque.

Here, the setting method of the target value of the steering reaction torque will be described with an example. In FIG. 3, an example of determining a target value of the steering reaction torque according to a position of the steering wheel 2, that is, a steering angle and a stopping/running state of the vehicle, is shown in a graph. In the example shown in FIG. 3, the target value is set such that the steering reaction torque increases as the steering angle increases. In addition, different target values are set for each of stopping and running. Specifically, when the vehicle is stopping, a target value is set such that a large steering reaction torque is generated compared to when the vehicle is running.

Figure 4:
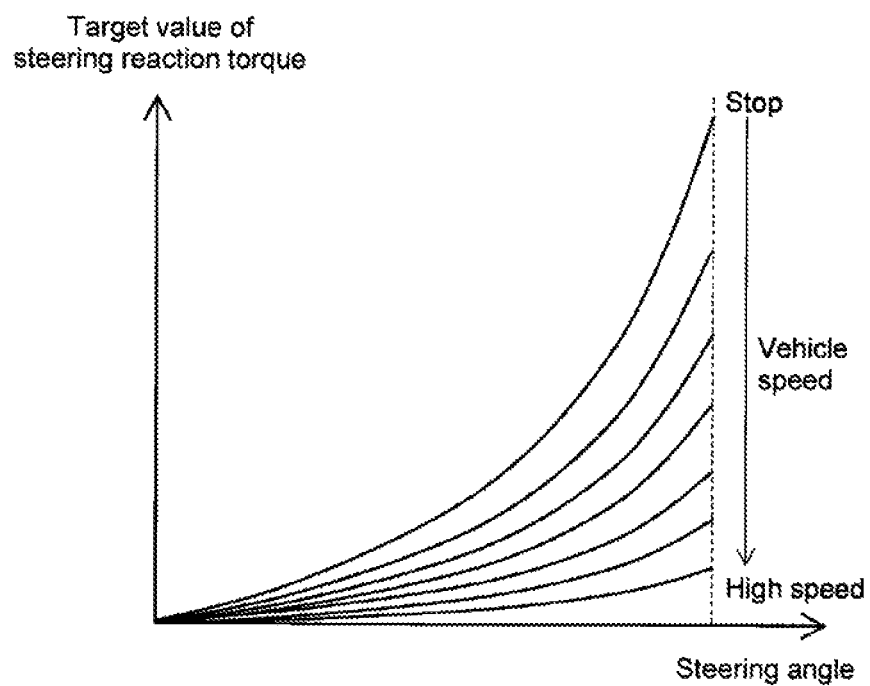
FIG. 4 is a diagram illustrating another example of the setting method of the target value of the steering reaction torque.

In FIG. 4, an example of determining a target value of the steering reaction torque according to a steering angle and a vehicle speed is shown in a graph. In the example shown in FIG. 4, a target value is set such that the steering reaction torque increases as the steering angle increases, and the steering reaction torque decreases as the vehicle speed increases. In addition to these examples, the target value of the steering reaction torque can be arbitrarily set with respect to the state quantities of the vehicle, such as, for example, the larger the yaw rate or the larger the lateral acceleration, the larger the target value of the steering reaction torque.

Returning to FIG. 2 again, the explanation on setting the target value of the steering reaction torque will be continued. In setting the target value of the steering reaction torque, in addition, various physical quantities corresponding to external factors are also referred to. External factors which are referred to include, for example, a demand on steering feeling from a driver, an estimated value of road surface μ, a cant amount of road surface, a crosswind speed, etc. The demand on steering feeling from a driver is, for example, a demand for heavy feeling or light feeling, and the steering feeling is selected by a switch in a room. The road surface μ, the cant quantity and the crosswind speed are estimated by known methods based on information acquired by sensors and infrastructural information acquired by communication devices.

In the relationship between the target value of the steering reaction torque and the steering feeling demand, when heavy steering feeling is demanded, the target value of the steering reaction torque is made larger compared with the case where light steering feeling is demanded. In the relationship with the road surface μ, for example, the target value of the steering reaction torque is made smaller as the road surface μ is smaller. Even in the relation with the cant amount, the crosswind speed, or the like, the target value of the steering reaction torque is appropriately corrected so that the driver does not feel uncomfortable when these external factors act.

The steering assist mechanism position target calculating unit 32 calculates the position target of the steering assist mechanism 7 according to the following Equation 1 based on the position of the steering wheel 2 acquired by the steering wheel position acquiring unit 30 and the target value of the steering reaction torque set by the steering reaction torque target value setting unit 31. In Equation 1, $\theta_T$ is the position target (rad) of the steering assist mechanism 7, $M_A$ is the position (rad) of the steering wheel 2, and $M_T$ is the target value (N*m) of the steering reaction torque. Further, $K_T$ is a torsional spring constant (N*m/rad) of the steering shaft 3 between the steering wheel rotation angle sensor 10 and the steering assist mechanism rotation angle sensor 11.

$$\theta_T = M_A - (M_T/K_T) \qquad \text{Equation 1}$$

The position target of the steering assist mechanism 7, which is calculated by the steering assist mechanism position target calculating unit 32, is input to the mediation unit 33. Requests regarding the position target of the steering assist mechanism 7 from other systems are also input to the mediation unit 33. Other systems include systems involving position control of the steering assist mechanism 7, including, for example, pre-crash system, automatic driving system, automatic parking system, and the like. When requests relating to the position target of the steering assist mechanism 7 are input from other systems, the mediation unit 33 basically prioritizes those requests with respect to the position target calculated by the steering assist mechanism position target calculating unit 32. In addition, depending on the type of other systems that are issuing the request, the maximum value selection or the minimum value selection may be used as a mediation method. The mediation unit 33 inputs the position target of the steering assist mechanism 7 after the mediation into the steering assist mechanism position control unit 34.

The steering assist mechanism position control unit 34 performs feedback control of the motor 8, more particularly, servo control of the motor 8 according to the position target of the steering assist mechanism 7. The real position of the steering assist mechanism 7 detected by the steering assist mechanism rotation angle sensor 11 is input to the steering assist mechanism position control unit 34. The steering assist mechanism position control unit 34 determines a target value of a current to be supplied to the motor 8 in accordance with a deviation of the actual position of the input steering assist mechanism 7 from the position target. The steering assist mechanism position control unit 34 inputs the determined motor current target value to the steering assist driving unit 35. The steering assist driving unit 35 is a driver for driving the motor 8, and controls the current supplied to the motor 8 according to the given motor current target value.

As described above, the controller 201 determines the position target of the steering assist mechanism 7 so that the steering reaction torque according to the target set based on the position of the steering wheel 2 or the like acts on the steering wheel 2, and performs feedback control of the motor 8 so that the position target of the steering assist mechanism 7 is realized. In other words, in the conventional electric power steering apparatus, torque control is performed as control of the steering assist mechanism, whereas in the electric power steering apparatus 101 of the present embodiment, position control is performed as control of the steering assist mechanism 7.

According to the position control of the steering assist mechanism 7, the steering reaction torque according to the target acts on the steering wheel 2, regardless of the vehicle conditions, such as changes in the loading amount and the tire specifications. Thus, according to the electric power steering apparatus 101 of the present embodiment, the driver can obtain a constant steering feeling regardless of the vehicle conditions.

In addition, the electric power steering apparatus 101 according to the present embodiment is advantageous in comparison with the conventional electric power steering apparatus in terms of the reduction of the man-hours required for adaptation. The turning force required to turn the steering wheel differs for each type of vehicle. Therefore, in the case of the conventional electric power steering apparatus, in order to obtain a constant steering feeling regardless of the type of vehicle, it was necessary to adapt the assist torque of the steering assist mechanism to each vehicle type so that the necessary steering force does not differ depending on the vehicle type. In contrast, in the electric power steering apparatus 101 according to the present embodiment, since the steering reaction torque according to the target is applied to the steering wheel 2 by the position control of the steering assist mechanism 7, it is possible to eliminate the need for the adaptation work in consideration of the difference in the turning force for each vehicle type.

In the conventional electric power steering apparatus, on a rough road surface, it is sometimes difficult to keep the turning angle constant by losing steering control by the unevenness of the road surface. In this regard, according to the electric power steering apparatus 101 of the present embodiment, since the feedback control of the motor 8 is performed so as to eliminate the deviation between the real position and the target position of the steering assist mechanism 7, the turning angle can be kept constant regardless of the condition of the road surface.

In addition, in conventional electric power steering apparatus, when a vehicle is traveling on a rough road surface, unpleasant kickback is likely to occur for the driver due to input from the road surface. In this regard, according to the electric power steering apparatus 101 according to the present embodiment, the steering reaction torque according to the target acts on the steering wheel 2 by the position control of the steering assist mechanism 7. Therefore, the input from the road surface is difficult to transmit to the steering wheel 2, and the occurrence of unpleasant kickback is suppressed even when the vehicle is running on the rough road surface. The suppression effect of the kickback by the electric power steering apparatus 101 of the present embodiment becomes particularly remarkable in a vehicle having a low torsional rigidity between the rotational speed sensors 10 and 11 of the steering shaft 3. In this respect, according to the electric power steering apparatus 101 of the present embodiment, it is possible to obtain a constant steering feeling regardless of not only the vehicle conditions but also the environmental conditions such as the road surface conditions.

Other effects of the electric power steering apparatus 101 of the present embodiment include the ease of coordination with other systems that require position control of the steering assist mechanism 7, such as automatic operation system, lane keeping assist system and the like. Whereas the conventional electric power steering apparatus performs torque control, the electric power steering apparatus 101 of this embodiment is a system that performs the same position control as that of other systems. Therefore, it can be easily coordinated with other systems, for example, as can be seen from the processing of the mediation unit 33.

2. Second Embodiment

Figure 5:
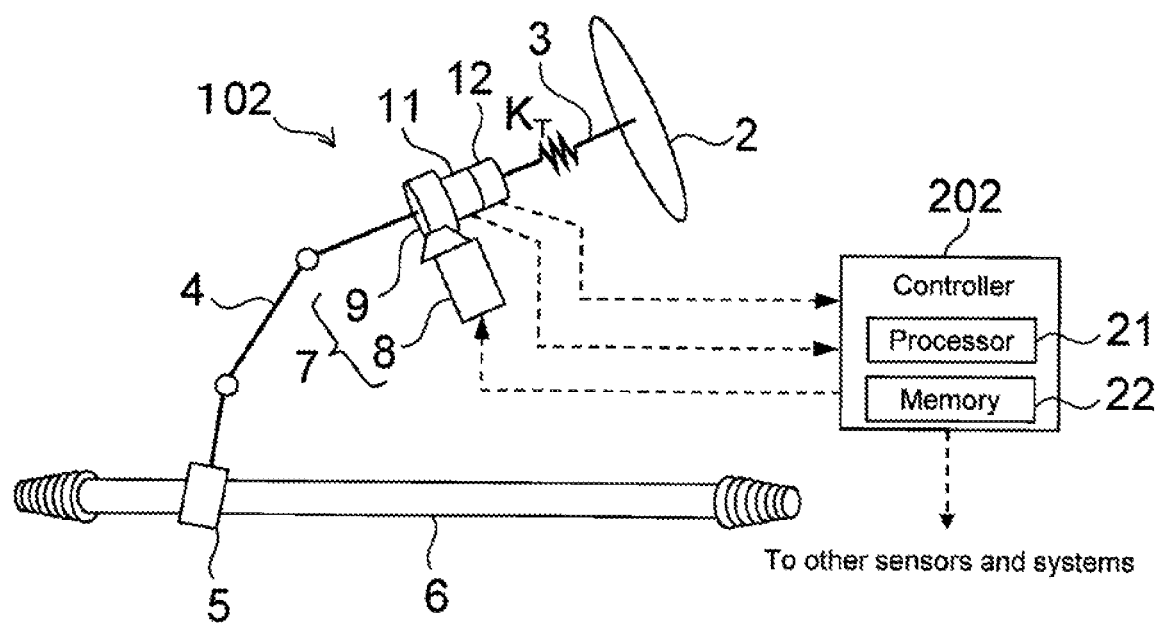
FIG. 5 is a diagram illustrating a configuration of an electric power steering apparatus according to a second embodiment of the present disclosure.

FIG. 5 is a diagram illustrating a configuration of an electric power steering apparatus 102 according to a second embodiment of the present disclosure. In this figure, the elements in common with those of the first embodiment, the same reference numerals are assigned. In the following description, the configuration already described in the first embodiment will be omitted to describe, and the configuration specific to this embodiment will be described.

The electric power steering apparatus 102 comprises a steering reaction torque sensor 12 instead of the steering wheel rotation angle sensor 10 (refer to FIG. 1). The steering reaction torque sensor 12 is a sensor for detecting the steering reaction torque acting on the steering shaft 3. The output of the steering reaction torque sensor 12 is input to the controller 202 together with the output of the steering assist mechanism rotation angle sensor 11. The controller 202 is an ECU (Electronic Control Unit) having at least one processor 21 and at least one memory 22, similar to the controller 201 (refer FIG. 1) of the first embodiment.

Figure 6:
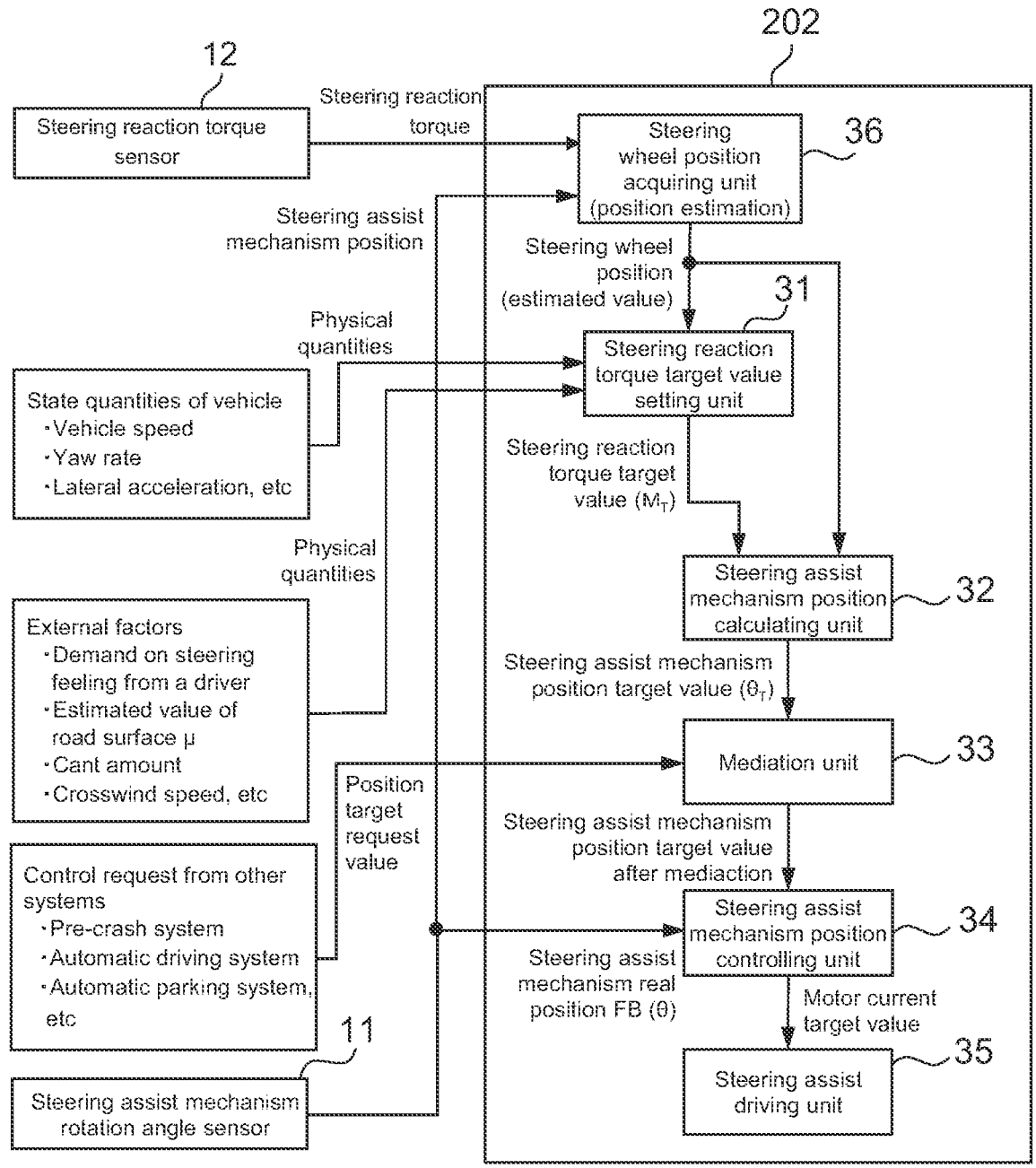
FIG. 6 is a diagram illustrating functions of a controller of the electric power steering apparatus according to the second embodiment of the present disclosure.

FIG. 6 is a diagram showing functions of the controller 202 of the present embodiment. In FIG. 6, functions related to steering assist control are represented by blocks. The controller 202 includes a steering wheel position acquiring unit 36, a steering reaction torque target value setting unit 31, a steering assist mechanism position calculating unit 32, a mediation unit 33, a steering assist mechanism position controlling unit 34, and a steering assist driving unit 35 as functions for steering assist control. Of these functions, the difference between the present embodiment and the first embodiment is in the function of the steering wheel position acquiring unit 36.

The steering wheel position acquiring unit 36 of this embodiment acquires the position of the steering assist mechanism detected by the steering assist mechanism rotation angle sensor 11 and the steering reaction torque detected by the steering reaction torque sensor 12. Then, based on the position of the steering assist mechanism and the steering reaction torque, the position $M_A$ of the steering wheel 2 is estimated by the following equation 2. In Equation 2, $\theta$ is the real position (rad) of the steering assist mechanism 7, and $T_1$ is the detected value (N*m) of the steering reaction torque.

$$M_A = \theta + (T_1/K_T) \qquad \text{Equation 2}$$

In this embodiment, the position of the steering wheel 2 estimated based on the position of the steering assist mechanism and the steering reaction torque is input to the steering reaction torque target value setting unit 31 and the steering assist mechanism position target calculating unit 32. Generally, the reliability in the steering assist control application is higher for the steering reaction torque sensor 12 than for the steering wheel rotation angle sensor. In addition to the effect similar to that of the first embodiment, there is also an advantage that the position control of the steering assist mechanism 7 can be performed using the steering reaction torque sensor 12, which is more reliable.

3. Other Embodiments

In the first embodiment and the second embodiment, instead of the steering assist mechanism rotation angle sensor 11, a motor rotation angle sensor for detecting the position of the motor 8 of the steering assist mechanism 7 may be used. The position $\theta$ of the steering assist mechanism 7 can be calculated from the position of the motor 8 by the following Equation 3. In Equation 3, $\theta_M$ is the position of the motor 8 (rad), the $R_G$ is the reduction ratio of the reduction gear mechanism 9. In this case, the motor rotation angle sensor can also be grasped as part of the steering assist mechanism rotation angle sensor.

$$\theta = \theta_M/R_G \qquad \text{Equation 3}$$

What is claimed is:

1. An electric power steering apparatus comprising:
a steering assist mechanism driven by a motor and assisting operation of a steering wheel by a driver;
a steering assist mechanism rotation angle sensor for detecting a position of the steering assist mechanism; and
a controller comprising at least one processor and at least one memory coupled to the at least one processor, the at least one memory including at least one program that causes the at least one processor to execute:
acquiring processing of acquiring a position of the steering wheel;
setting processing of setting a target value of a steering reaction torque acting on the steering wheel;
calculating processing of calculating a position target of the steering assist mechanism based on a position of the steering wheel and the target value of the steering reaction torque; and
controlling processing of performing feedback control of the motor which determines a target value of a current to be supplied to the motor in accordance with a deviation of the position of the steering assist mechanism detected by the steering assist mechanism rotation angle sensor from the position target of the steering assist mechanism.

2. The electric power steering apparatus according to claim 1, further comprising a steering wheel rotation angle sensor for detecting a position of the steering wheel,
wherein the at least one program causes the at least one processor to, in the acquiring processing, acquire the position of the steering wheel detected by the steering wheel rotation angle sensor.

3. The electric power steering apparatus according to claim 1, further comprising a steering reaction torque sensor for detecting a steering reaction torque acting on the steering wheel,
wherein the at least one program causes the at least one processor to, in the acquiring processing, acquire the position of the steering wheel estimated based on the position of the steering assist mechanism detected by the steering assist mechanism rotation angle sensor and the steering reaction torque detected by the steering reaction torque sensor.

4. The electric power steering apparatus according to claim 1, wherein the at least one program causes the at least one processor to, in the setting processing, set the target value of the steering reaction torque based on the position of the steering wheel acquired in the acquiring processing.

\* \* \* \* \*